Figure 1:
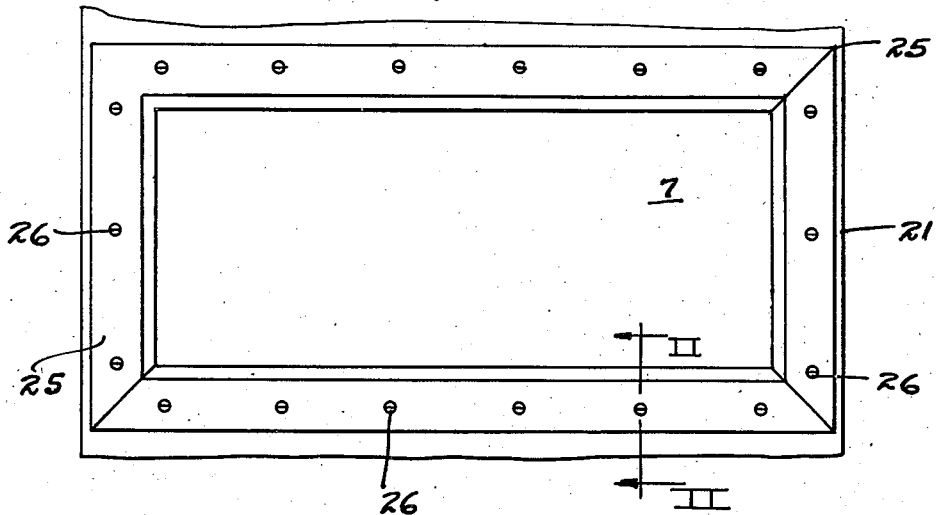

Nov. 25, 1941.  O. D. ENGLEHART ET AL  2,264,176
MULTIPLE GLAZED UNIT
Filed Feb. 6, 1940

INVENTORS
OSCAR O. ENGLEHART AND
PAUL H. BALDWIN
BY Olew E. Bee
ATTORNEY.

Patented Nov. 25, 1941

2,264,176

UNITED STATES PATENT OFFICE 2,264,176

MULTIPLE GLAZED UNIT

Oscar D. Englehart, Brackenridge, and Paul H. Baldwin, Tarentum, Pa., assignors to Pittsburgh Plate Glass Company, a corporation of Pennsylvania Application February 6, 1940, Serial No. 317,514

3 Claims. (Cl. 189—64)

The present invention relates to insulated window constructions and more particularly to multiple glazed units wherein a special frame structure is employed to prevent condensation of moisture upon the inner surfaces of the glass plates of the units.

One object of the invention is the provision of a multiple glazed unit in which a controlled condensation of moisture vapor entrapped or entering therein precludes so-called "fogging" of the glass surfaces of the unit.

A second object of the invention is the provision of an insulated frame for a multiple glazed unit by means of which the ordinary heat losses through the frame are reduced to a minimum.

Other objects and advantages of the invention will become more apparent from the following detailed description of a preferred embodiment thereof.

Multiple or double glazing has become of increased importance during the past few years as engineers and technicians have sought means of increasing the efficiency of temperature control of dwellings, offices and the like. This work has been hampered by the difficulty of maintaining absolute anhydrous conditions within the multiple glazed units and the temperature gradient between opposite faces thereof has resulted in a condensation of entrapped moisture upon the inner glass surfaces of the units. The condensed moisture not only impairs visibility through the unit but also results very often in a staining or etching of the glass due to the leaching out of soluble alkalies therefrom.

It has been proposed to place desiccants within the units in order that any moisture entrapped within them will be absorbed thereby and no condensation will occur. Additional water vapor will enter the units, however, since no material is presently available to provide a vapor-tight seal. Accordingly the desiccants are rapidly exhausted and unless replaced the excess moisture will again be condensed upon the glass.

Another possible solution of the problem lies in the provision of ventilating ducts permitting free circulation of air through the units. Manifestly, such expedient reduces the insulating efficiency of the multiple glazed unit while at the same time dust and other foreign material enters and clouds the glass surfaces.

Briefly stated, our invention contemplates the use of a special insulated frame holding a plurality of glass plates, the air space intermediate thereof being in communication with a chamber provided in the frame wherein any condensation of moisture will occur.

Figure 2:
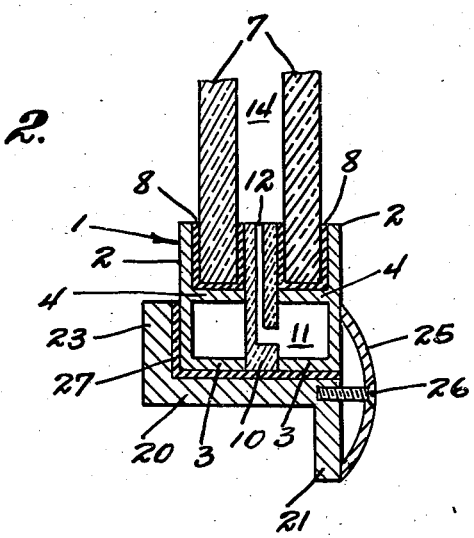

One embodiment of the invention is illustrated in the accompanying drawing, wherein:

Figure 1 is a front elevational view of a multiple glazed unit as positioned for use within a car; and Figure 2 is a fragmentary vertical section thereof taken substantially along the line II—II of Figure 1.

Referring to the drawing, a metal frame 1 comprises two complementary sections 2 with base flanges 3 and ledges 4 extending therefrom in spaced relation. A plurality of glass plates 7 with marginal cushioning members 8 of rubber or other resilient material, substantially of U-shape in cross-section are positioned upon the ledges 4. A bar 10 of insulating material, as for example, wood or fiber impregnated with wax or other material having a low moisture capacity and diffusion rate, is interposed between the sections 2 of the frame as a spacing element. The addition of the bar 10 to the unit forms a chamber 11 within the frame section 2 lying to the outside of the unit and ducts 12 are provided in the bar 10 at suitable spaced intervals to establish communication between the air space 14 intermediate the glass plates and the chamber 11.

The metal frame 1 is secured within an opening defined by a shoulder 20 projecting inwardly from a wall 21 and terminating in a flange 23 by means of a retainer strip 25 overlying the frame 1 and the wall 21 and fastened to the latter by bolts 26. A layer 27 of rubber or other resilient material is interposed between the frame 1 and the shoulder 20 to serve as a cushioning support for the multiple glazed unit.

The marginal cushioning strips 8 are formed as thin as possible to reduce the flow of moisture therethrough into the air space 14 of the unit. The infiltration of water vapor cannot be prevented entirely, however, and the water vapor content of the air in the space 14 will increase until it is in equilibrium with the vapor pressure of the atmosphere.

As the temperature of the atmosphere decreases, the glass plate 7 facing the outside is cooled and ordinarily the water vapor in the space 14 would condense thereon. The outside section 2 of the metal frame will be colder than the glass, however, and since the air space 14 is in communication with the chamber 11 facing the cold side, the water vapor will not condense on the glass plate 7 but will condense within the chamber 11. An increase of temperature upon the outside of the unit will tend to vaporize the moisture in the chamber 11 and as the vapor pressure within the space 14 will be higher than that of the atmosphere, there will be an outward flow of water vapor through the elements 3.

Since the spacer bar 10 divides the metal frame 1, the section 2 thereof facing the warm or inner side of the unit will be maintained more nearly at the temperature of the warm side and no condensation of moisture will be experienced thereon. It should also be pointed out that the insulated frame reduces heat losses through conduction.

What we claim is:

1. A multiple glazed unit comprising a pair of opposed, complementary metal sash sections substantially of L-shape in cross-section, a glass plate supported in each section upon a ledge provided therein and spaced inwardly from the base portion of the sash section, a spacer of insulating material interposed between the sections and extending from the base portion inwardly to overlie the edges of the glass plates, said spacer completing a chamber within the base of one of the sash sections, said spacer having ducts therethrough establishing communication between the air space intermediate the glass plates and the chamber, and means securing the sash sections together.

2. A multiple glazed unit comprising a pair of opposed, complementary metal sash sections substantially of L-shape in cross-section, a glass plate supported in each section upon a ledge provided therein and spaced inwardly from the base portion of the sash section, a spacer of insulating material interposed between the sections and extending from the base portion inwardly to overlie the edges of the glass plates, said spacer completing two chambers within the base of the sash, said spacer having ducts therethrough establishing communication between the air space intermediate the glass plates and the chamber on that side of the sash which will be subject to reduced temperatures, and means securing the sash sections together.

3. In combination with a wall having an opening therein, a multiple glazed window positioned within said opening, the unit comprising a metal frame formed of two opposed, complementary sash sections substantially of L-shape in cross-section, a glass plate supported in each section upon a ledge provided therein and spaced inwardly from the base portion of the sash section, a spacer of insulating material interposed between the sections and extending from the base portion inwardly to overlie the edges of the glass plates, said spacer completing two chambers within the base of the sash, said spacer having ducts therethrough establishing communication between the air space intermediate the glass plates and the chamber on that side of the sash which will be subject to reduced temperatures, and means securing the sash sections together and retaining the unit within the wall opening.

OSCAR D. ENGLEHART.
PAUL H. BALDWIN.